United States Patent
Matsuoka et al.

(10) Patent No.: US 10,977,935 B2
(45) Date of Patent: Apr. 13, 2021

(54) INFORMATION PROCESSING DEVICE, VEHICLE-MOUNTED DEVICE, AND INFORMATION PROCESSING METHOD

(71) Applicant: Toyota Jidosha Kabushiki Kaisha, Toyota (JP)

(72) Inventors: Tomohito Matsuoka, Nagoya (JP); Seiichi Tsunoda, Nisshin (JP); Jiro Goto, Seto (JP); Masayuki Yamada, Chofu (JP); Yasutaka Eto, Okazaki (JP); Keima Fukunaga, Toyota (JP); Kinya Tagawa, Minato-ku Tokyo-to (JP); Yasuhiro Sasaki, Minato-ku Tokyo-to (JP); Sho Tanaka, Minato-ku Tokyo-to (JP); Yuki Shinohara, Minato-ku Tokyo-to (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 233 days.

(21) Appl. No.: 16/224,002

(22) Filed: Dec. 18, 2018

(65) Prior Publication Data
US 2019/0197885 A1 Jun. 27, 2019

(30) Foreign Application Priority Data
Dec. 26, 2017 (JP) .............................. JP2017-250046

(51) Int. Cl.
*G08G 1/01* (2006.01)
*G08G 1/0968* (2006.01)
*G06K 9/00* (2006.01)

(52) U.S. Cl.
CPC ....... *G08G 1/0133* (2013.01); *G06K 9/00791* (2013.01); *G08G 1/0968* (2013.01)

(58) Field of Classification Search
None
See application file for complete search history.

(56) References Cited

U.S. PATENT DOCUMENTS 10,737,689 B2 * 8/2020 Kim .................. B60W 10/20
2017/0132475 A1 * 5/2017 Oami ................ G06F 3/147

FOREIGN PATENT DOCUMENTS

WO 2002093487 A1 11/2002

* cited by examiner

*Primary Examiner* — Abdhesh K Jha
(74) *Attorney, Agent, or Firm* — Dinsmore & Shohl LLP (57) ABSTRACT

In an information processing device, an acquirer acquires a congestion degree in the vicinity of multiple vehicles arranged in a certain arrangement pattern. A deriver derives a move instruction for moving a target vehicle among the multiple vehicles such as to change a space between vehicles, on the basis of an acquired congestion degree. A communication unit transmits the move instruction to the target vehicle.

4 Claims, 9 Drawing Sheets

INFORMATION PROCESSING DEVICE, VEHICLE-MOUNTED DEVICE, AND INFORMATION PROCESSING METHOD

CROSS-REFERENCE TO RELATED APPLICATION

This application claims priority to Japanese Patent Application No. 2017-250046 filed on Dec. 26, 2017, incorporated herein by reference in its entirety.

BACKGROUND

1. Technical Field

The present disclosure relates to an information processing device, a vehicle-mounted device, and an information processing method, used to process information regarding vehicles.

2. Description of Related Art

There has been known a system capable of computing a congestion degree in an event, such as an exhibition (see WO 2002/093487, for example).

In the above-mentioned technology, however, even when there is congestion, reduction thereof is not considered.

SUMMARY

The present disclosure addresses the above-described issuer and a general purpose thereof is to provide an information processing device, a vehicle mounted device, and an in formation processing method, with which congestion can be appropriately handled in a state where multiple vehicles are arranged.

To resolve the issue above, an information processing device of one embodiment includes: an acquirer configured to acquire a congestion degree in a vicinity of a plurality of vehicles arranged in a predetermined arrangement pattern; a deriver configured to derive a move instruction for moving a target vehicle among the plurality of vehicles such as to change a space between vehicles, on the basis of an acquired congestion degree; and a communication unit configured to transmit the move instruction to the target vehicle.

According to this embodiment, a space between vehicles can be changed based on a congestion degree. Therefore, congestion can be appropriately handled in a state where multiple vehicles are arranged.

When the acquired congestion degree is a first threshold or greater, the deriver may derive a move instruction for moving the target vehicle such as to broaden the space between vehicles.

When the acquired congestion degree is a second threshold or less, the deriver may derive a move instruction for moving the target vehicle such as to narrow the space between vehicles, and the second threshold may be smaller than the first threshold.

Another embodiment relates to a vehicle-mounted device. The device is a vehicle-mounted device configured to be mounted on a vehicle, and the vehicle-mounted device includes: an imager configured to capture an image of the vicinity of the vehicle; a deriver configured to derive a congestion degree in the vicinity of the vehicle, on the basis of the image captured by the imager; a communication unit configured to transmit the congestion degree derived by the deriver to an information processing device and to receive, from the information processing device, a move instruction derived to change a space between vehicles on the basis of the congestion degree; and a vehicle controller configured to move the vehicle in accordance with the move instruction.

According to this embodiment, a space between vehicles can be changed based on a congestion degree. Therefore, congestion can be appropriately handled in a state where multiple vehicles are arranged.

The vehicle-mounted device may further include an announcement unit configured to announce, to the vicinity of the vehicle, the vehicle's moving when the communication unit receives the move instruction.

Yet another embodiment relates to an information processing method. The method includes: acquiring a congestion degree in a vicinity of a plurality of vehicles arranged in a predetermined arrangement pattern; deriving a move instruction for moving a target vehicle among the plurality of vehicles such as to change a space between vehicles, on the basis of an acquired congestion degree; and transmitting the move instruction to the target vehicle.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

An embodiment will now be described. The embodiment is illustrative and is not intended to be limiting.

Figure 1:
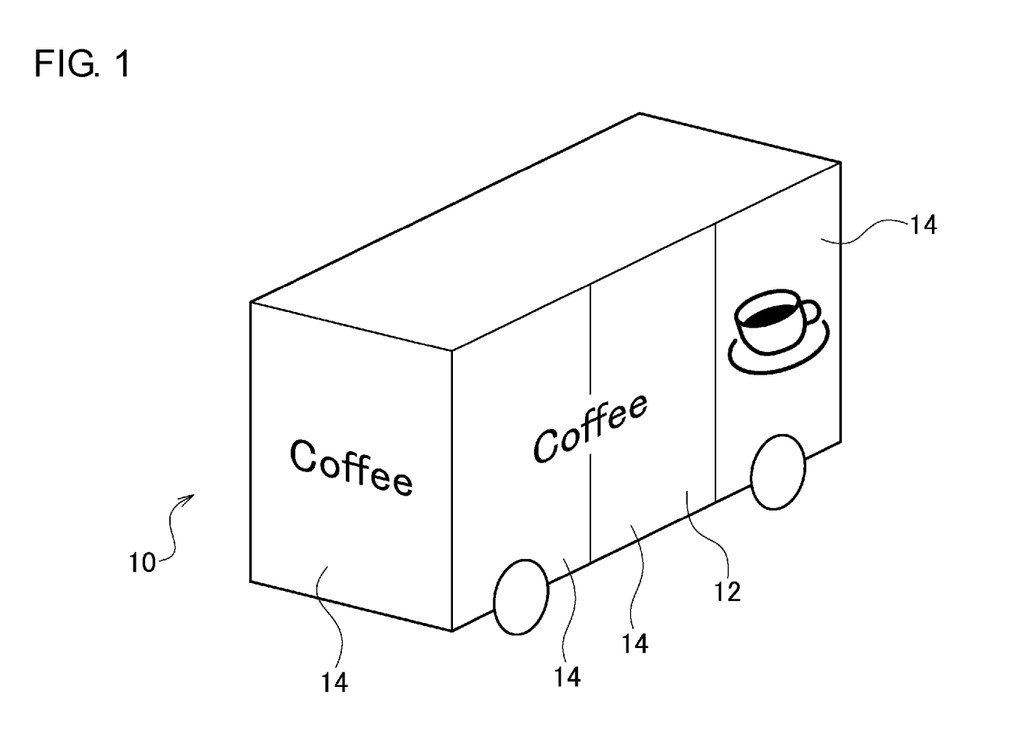
FIG. 1 is a perspective view that schematically shows a vehicle according to an embodiment.

FIG. 1 is a perspective view that schematically shows a vehicle 10 according to an embodiment. The vehicle 10 provides a predetermined service. The service may be a food and drink service, a product sales service, a financial service, a medical service, an energy providing service, and an administrative service, for example, and is not particularly limited. Facilities mounted on the vehicle 10 are determined depending on the service to be provided.

The vehicle 10 may be an electric vehicle, for example, but is not particularly limited. The vehicle 10 comprises a door 12 and multiple display panels 14. The door 12 is provided, for example, on at least one side surface of the vehicle 10 and is slid to be opened or closed. The display panel 14 is provided on each of the front surface, side surfaces, and rear surface of the vehicle 10. The display panel 14 is also provided on the door 12. The display panel 14 displays an image related to the service provided by the vehicle 18. In the example shown in FIG. 1, the vehicle 10 provides a food and drink service, more specifically a drink service. The display panels 14 display the characters of "Coffee" and an image of a coffee cap, related to the drink service.

Figure 2:
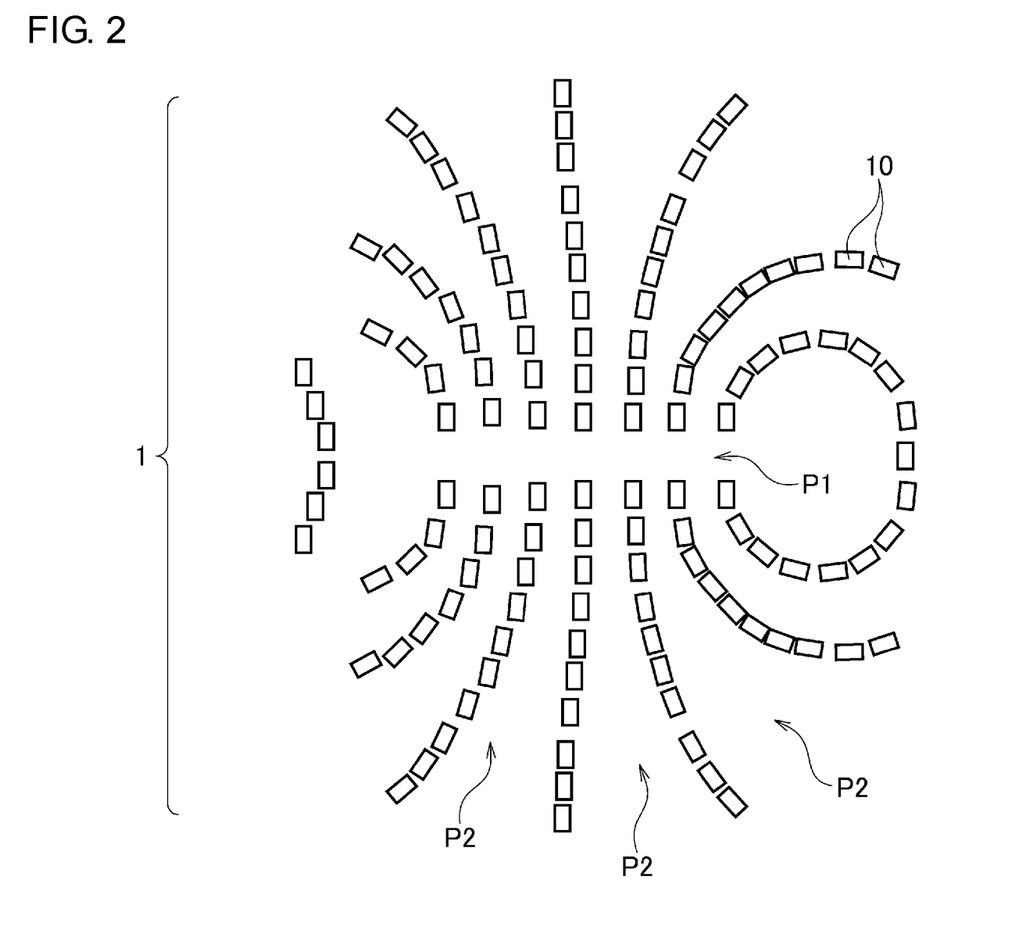
FIG. 2 is a bird's-eye view that shows a first example of an arrangement pattern of a vehicle system in which a plurality of the vehicles shown in FIG. 1 are arranged.

FIG. 2 is a bird's-eye view that shows a first example of an arrangement pattern of a vehicle system 1 in which a plurality of the vehicles 10 shown in FIG. 1 are arranged. The vehicle system 1 comprises multiple vehicles 10 as one unit providing multiple services. The multiple vehicles 10 are arranged in a predetermined arrangement pattern. In the arrangement pattern, a main passage P1 and multiple sub-passages P2 are provided. Each vehicle 10 performs automated driving under the control of a server device, which will be described later, and stops in a predetermined direction at a predetermined position specific to each vehicle 10 in the arrangement pattern shown in FIG. 2. Alternatively, each vehicle 10 may be driven by a driver to be located at a corresponding position in the arrangement pattern. A visitor can walk along the main passage P1 and the sub-passages P2 among the vehicles 10 and move to a vehicle 10 providing a desired service.

Figure 3:
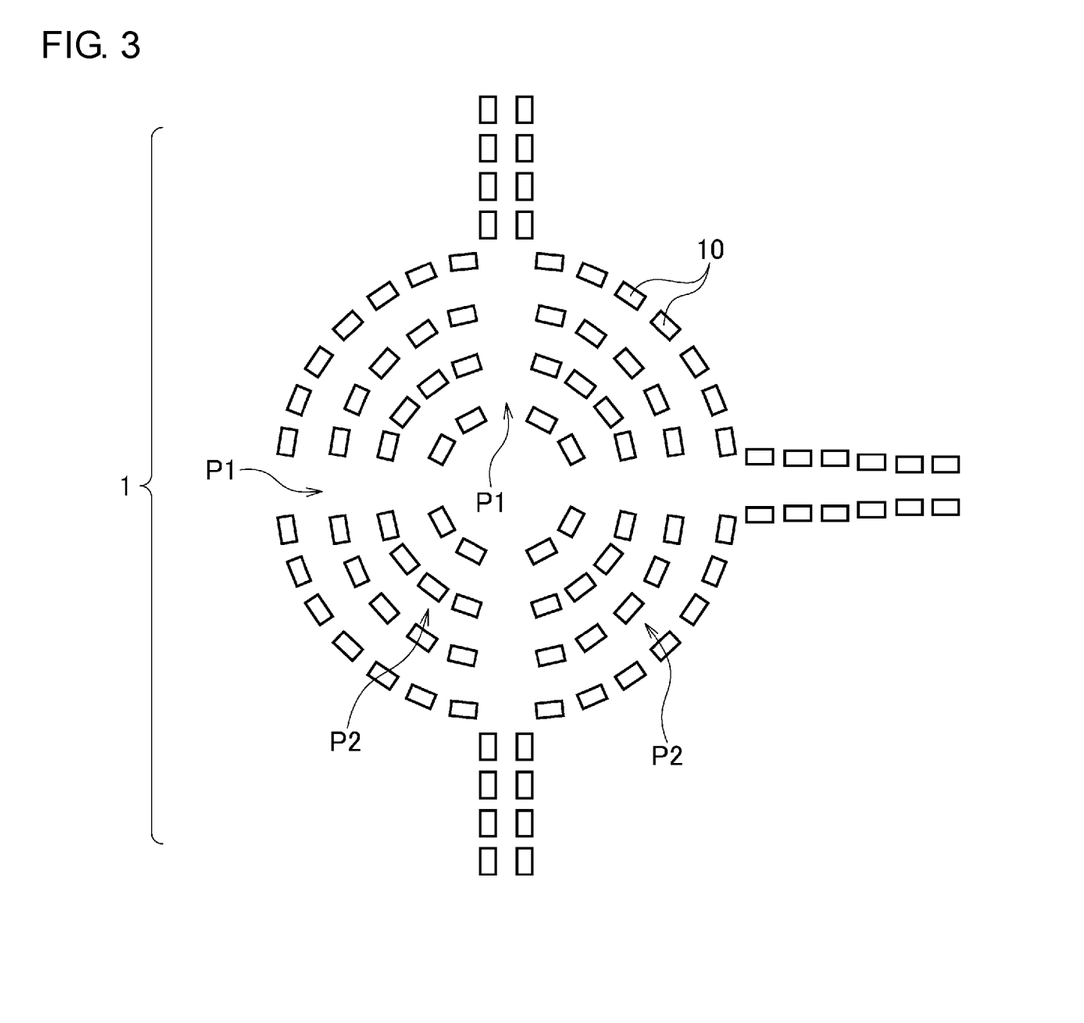
FIG. 3 is a bird's-eye view that shows a second example of the arrangement pattern of the vehicle system in which a plurality of the vehicles shown in FIG. 1 are arranged.
Figure 4:
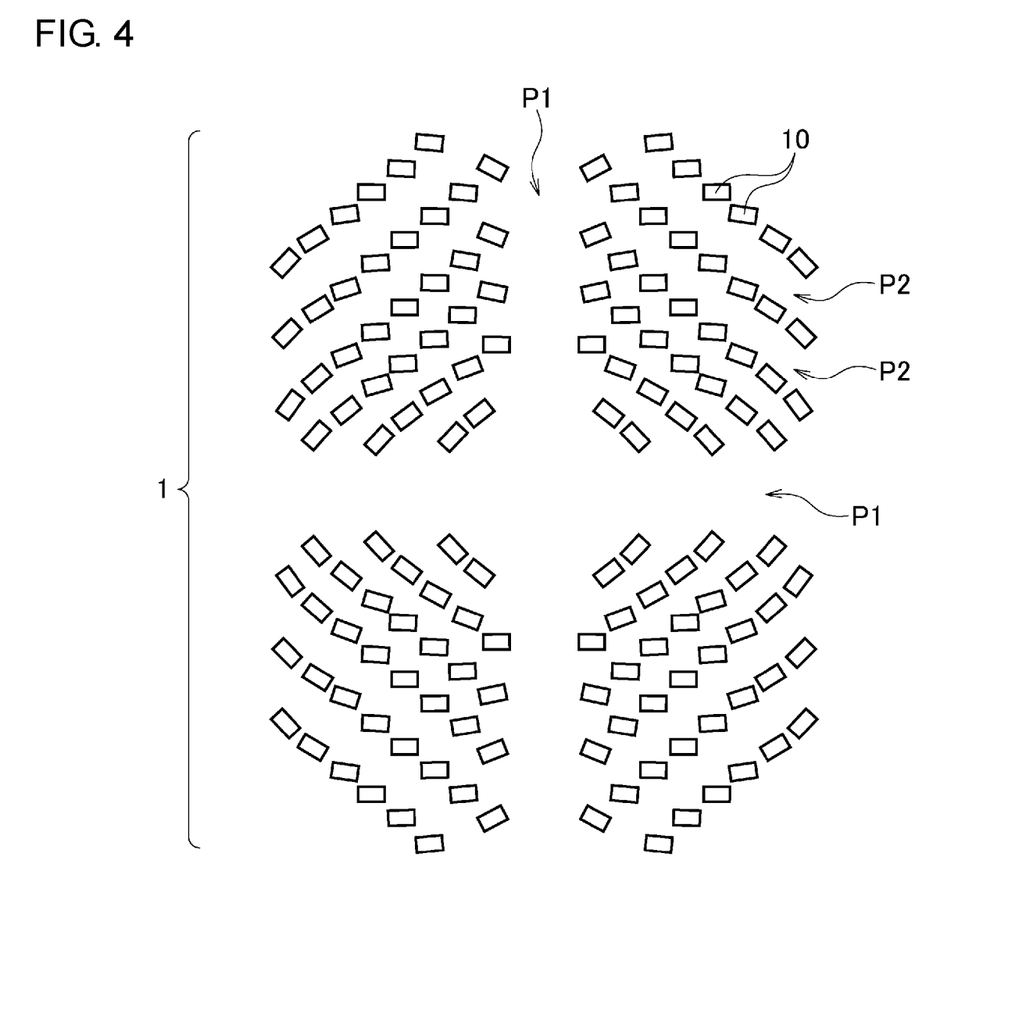
FIG. 4 is a bird's-eye view that shows a third example of the arrangement pattern of the vehicle system in which a plurality of the vehicles shown in FIG. 1 are arranged.

FIG. 3 is a bird's-eye view that shows a second example of the arrangement pattern of the vehicle system 1 in which a plurality of the vehicles 10 shown in FIG. 1 are arranged. FIG. 4 is a bird's-eye view that shows a third example of the arrangement pattern of the vehicle system 1 in which a plurality of the vehicles 10 shown in FIG. 1 are arranged. Also in these arrangement patterns, the main passages P1 and the sub-passages P2 are provided. The arrangement patterns are not limited to the illustrated examples and may be arbitrary patterns.

Depending on the combination of the multiple services provided by the multiple vehicles 10, the vehicle system 1 may be provided for a local festival, an event for development of an area, a tourist site, an event for brand user experience (UX), a company event, a sports festival, Japanese Bon festival dance, a shelter in a disaster area, and the likes. Also, depending on the combination of the multiple services, the vehicle system 1 can constitute an aggregation of multiple medical facilities, a food mall, an aggregation of financial institutes, and the like.

For example, when the vehicle system 1 is provided for a shelter in a disaster area, multiple vehicles 10 in one unit may suitably provide multiple services for enabling visitors to live their lives without infrastructure.

Also, when the vehicle system 1 is provided in an event for brand user experience, for example, in order to establish a brand image, multiple vehicles 10 providing multiple services may suitably display, on the display panels 14, a brand color specific to the brand. An event for brand user experience is an event in which visitors can experience products or the like of a certain brand.

Figure 5:
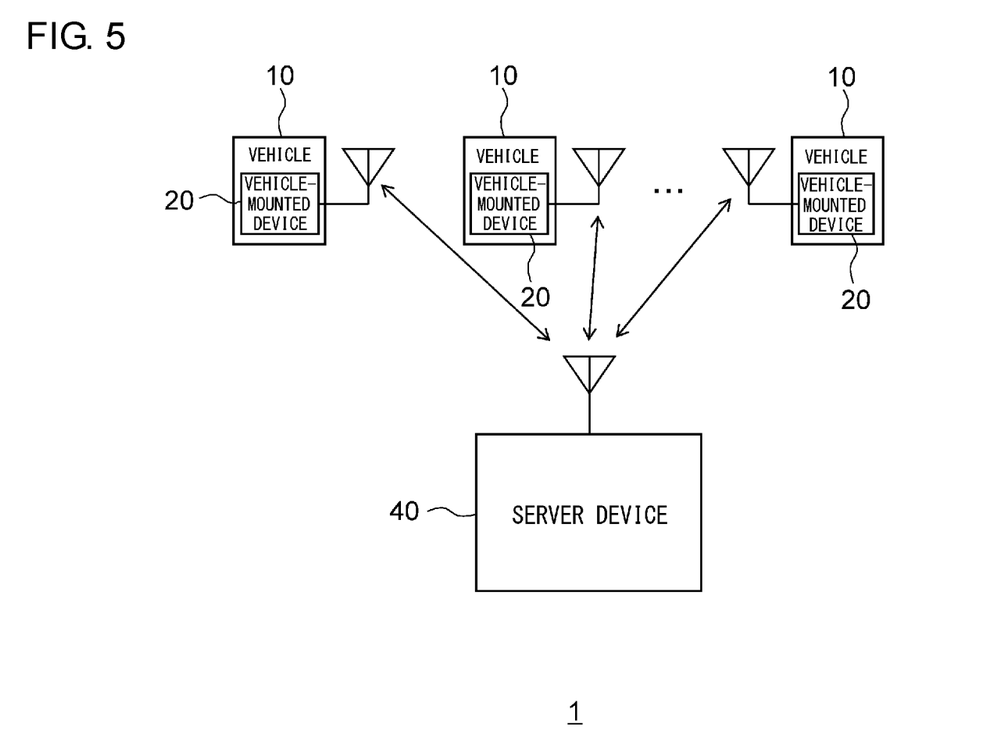
FIG. 5 is a block diagram of the vehicle system shown in FIG. 2.

FIG. 5 is a block diagram of the vehicle system 1 shown in FIG. 2. The vehicle system 1 comprises multiple vehicle-mounted devices 20 and a server device 40. FIG. 5 shows three vehicle-mounted devices 20 among the multiple vehicle-mounted devices 20.

Each vehicle-mounted device 20 is mounted on a vehicle 10. Each vehicle-mounted device 20 performs wireless communication with the server device 40. The wireless communication standard is not particularly limited, and may be wireless LAN, 3G (third-generation mobile communication system), 4G (fourth-generation mobile communication system), or 5G (fifth-generation mobile communication system), for example. Each vehicle-mounted device 20 may perform wireless communication with the server device 40 via a base station, which is not illustrated.

The server device 40 functions as an information processing device for processing information transmitted from the vehicle-mounted devices 20. The server device 40 may be configured as a terminal device carried by a manager of the vehicle system 1, for example.

Figure 6:
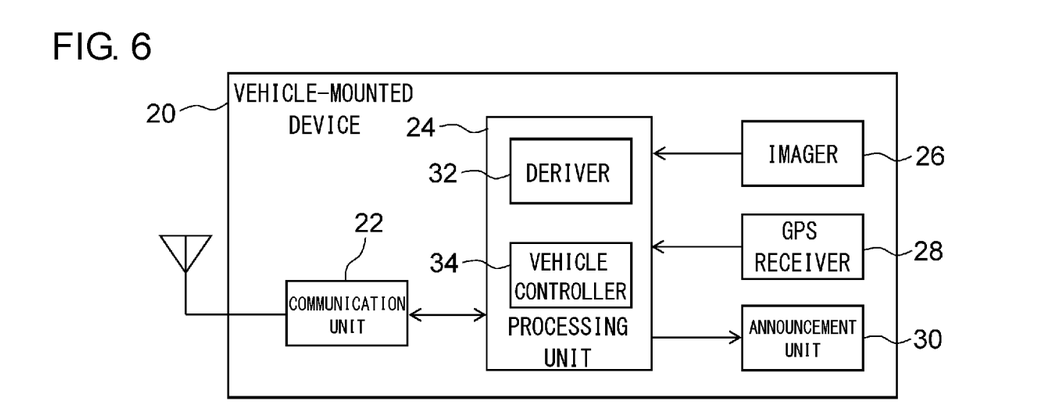
FIG. 6 is a block diagram that shows a configuration of a vehicle-mounted device shown in FIG. 5.

FIG. 6 is a block diagram that shows a configuration of a vehicle-mounted device 20 shown in FIG. 5. The vehicle-mounted device 20 comprises a communication unit 22, a processing unit 24, an imager 26, a GPS receiver 28, and an announcement unit 30. The processing unit 24 includes a deriver 32 and a vehicle controller 34.

The imager 26 includes multiple cameras. The imager 26 regularly captures an image of the vicinity of the subject vehicle, on which the vehicle-mounted device 20 is mounted. Based on the image captured by the imager 26, the deriver 32 regularly derives a congestion degree in the vicinity of the subject vehicle. The deriver 32 derives the congestion degree for each of multiple predetermined directions, such as the front, rear, left, and right of the subject vehicle.

The congestion degree may be derived using a well-known technology. For example, the deriver 32 may perform image recognition based on the face of each person included in an image and detect, based on the recognition result, the number of persons per unit area in the vicinity of the subject vehicle, so as to derive the congestion degree based on the number of persons. The frequency of deriving a congestion degree can be appropriately determined through experiments or the like. The deriver 32 outputs the congestion degree thus derived to the communication unit 22. The deriver 32 derives a congestion degree while the subject vehicle is stopped, and need not necessarily derive a congestion degree while the subject vehicle is moving.

The GPS receiver 28 receives signals from GPS satellites and derives the position and direction of the subject vehicle. The position includes latitude and longitude. The GPS receiver 28 outputs the information regarding the position and direction of the subject vehicle to the processing unit 24.

The communication unit 22 performs wireless communication with the server device 40. The communication unit 22 regularly transmits to the server device 40 a congestion degree derived by the deriver 32 and the information regarding the position and direction derived by the GPS receiver 28. Referring to the information, information for identifying the vehicle 10 as the transmission source is attached.

When a move instruction is transmitted from the server device 40 to the subject vehicle, the communication unit 22 receives the move instruction. The communication unit 22 then outputs the move instruction thus received to the processing unit 24.

The move instruction includes position information of the move destination of the subject vehicle and information regarding the direction of the subject vehicle at the move destination. The position information of the move destination includes latitude and longitude. The information regarding the direction includes a bearing.

In accordance with the move instruction received at the communication unit 22, the vehicle controller 34 controls a drive motor, braking device, steering gear, and the like, which are not illustrated, such that the subject vehicle automatically moves. For such control, a well-known automated driving technology can be employed. It is assumed that each vehicle 10 can also linearly move in the left and right directions.

Based on an image of the vicinity of the subject vehicle captured by the imager 26, when there is no obstacle, such as a person, in the traveling direction, the vehicle controller 34 moves the subject vehicle. When there is an obstacle, such as a person, in the traveling direction, the vehicle controller 34 does not move the subject vehicle and places the subject vehicle on standby. When the position and direction of the subject vehicle coincide with those specified in the move instruction received at the communication unit 22, the vehicle controller 34 stops the subject vehicle. The vehicle controller 34 may judge whether or not there is an obstacle in the traveling direction using information regarding obstacles around the subject vehicle acquired by an external sensor, which is not illustrated.

When the communication unit 22 receives the move instruction, the announcement unit 30 announces, to the vicinity of the subject vehicle, the subject vehicle's moving by means of sound or light or both. The sound may be a voice, saying "moving" or the like, or may be an alarm.

Figure 7:
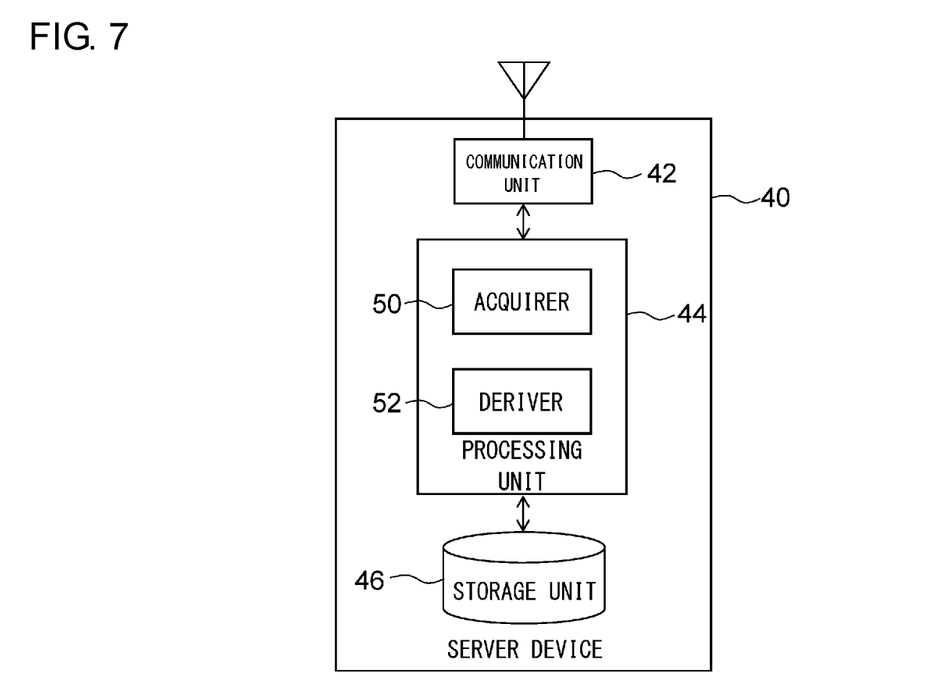
FIG. 7 is a block diagram that shows a configuration of a server device shown in FIG. 5.

FIG. 7 is a block diagram that shows a configuration of the server device 40 shown in FIG. 5. The server device 40 comprises a communication unit 42, a processing unit 44, and a storage unit 46. The processing unit 44 includes an acquirer 50 and a deriver 52.

The communication unit 42 performs wireless communication with the communication unit 22 of each of the multiple vehicle-mounted devices 20. The communication unit 42 receives, from the communication unit 22 of each of the multiple vehicle-mounted devices 20, a congestion degree in the vicinity of the corresponding vehicle 10 and the information regarding the position and direction of the corresponding vehicle 10. The communication unit 42 then outputs the information thus received to the processing unit 44.

The acquirer 50 acquires a congestion degree in the vicinity of each vehicle 10 and the information regarding the position and direction of each vehicle 10 output from the communication unit 42. This means that the acquirer 50 acquires congestion degrees in the vicinity of multiple vehicles 10 arranged in an arrangement pattern.

The storage unit 46 stores multiple arrangement patterns including those shown in FIGS. 2-4, for example. When an arrangement instruction is entered by a manager into an input unit, which is not illustrated, the deriver 52 selects one of multiple arrangement patterns stored in the storage unit 46 and derives a first move instruction for moving the multiple vehicles 10 to predetermined positions specific to the respective vehicles 10 in the selected arrangement pattern. The deriver 52 may select a predetermined arrangement pattern. The arrangement instruction may include information specifying the arrangement pattern entered by the manager. In this case, based on the information specifying the arrangement pattern, the deriver 52 selects one of multiple arrangement patterns stored in the storage unit 46. The deriver 52 outputs the first move instruction thus derived to the communication unit 42.

The communication unit 42 transmits the first move instruction to the multiple vehicles 10. Regarding the first move instruction, information for identifying the corresponding vehicle 10 is attached.

When the multiple vehicles 10 are arranged in an arrangement pattern in accordance with the first move instruction, based on each congestion degree and the information regarding the position and direction of each vehicle 10 acquired toy the acquirer 50, the deriver 52 derives a second move instruction for moving at least one target vehicle among the multiple vehicles 10 such as to change a space between vehicles 10.

More specifically, when an acquired congestion degree is a first threshold or greater, the deriver 52 derives the second move instruction for moving a target vehicle such as to broaden a space between vehicles 10. When an acquired congestion degree is a second threshold or less, the deriver 52 derives the second move instruction for moving a target vehicle such as to narrow a space between vehicles. The second threshold is smaller than the first threshold. The deriver 52 derives the second move instruction such that the space does not become a predetermined minimum value or smaller. When an acquired congestion degree is greater than the second threshold and smaller than the first threshold, the deriver 52 does not derive the second move instruction. The first threshold and the second threshold can be appropriately determined through experiments or the like.

When the congestion degree at a positron is the first threshold or greater, or when the congestion degree at a position is the second threshold or less, the deriver 52 may derive the second move instruction for moving a target vehicle located around the position.

When the congestion degree at each of multiple positions is the first threshold or greater, the deriver 52 may derive the second move instruction for moving all the vehicles 10 in the vehicle system 1 such as to broaden the spaces between neighboring vehicles 10 and make the entire arrangement pattern larger.

When the congestion degree at each of multiple positions is the second threshold or less, the deriver 52 may derive the second move instruction for moving all the vehicles 10 in the vehicle system 1 such as to narrow the spaces between neighboring vehicles 10 and make the entire arrangement pattern smaller.

When a congestion degree in the main passage P1 is the first threshold or greater, the deriver 52 may derive the second move instruction for moving a target vehicle such as to broaden the main passage P1. When a congestion degree in the main passage P1 is the second threshold or less, the deriver 52 may derive the second move instruction for moving a target vehicle such as to narrow the main passage P1.

When the positions of the outermost vehicles 10 in the arrangement pattern are limited because of the area limitation of the venue, the deriver 52 derives the second move instruction such that the positions of the outermost vehicles 10 in the arrangement pattern do not exceed the limits.

The deriver 52 outputs the second move instruction thus derived to the communication unit 42. Based on the derived second move instruction, the deriver 52 may provide, to a manager, the position of the move destination of a target vehicle by means of an image or the like using a display unit, which is not illustrated, and, when an approval operation is entered by the manager into the input unit, not illustrated, the deriver 52 may output the derived second move instruction to the communication unit 42. In this case, if the approval operation is not entered, the deriver 52 will not output the derived second move instruction to the communication unit 42.

The communication unit 42 transmits the second move instruction to the target vehicle. Regarding the second move instruction, information for identifying the target vehicle is attached.

The configuration may be implemented by a CPU or memory of any given computer, an LSI, or the like in terms of hardware, and by a memory-loaded program or the like in terms of software. In the present embodiment, a functional block configuration realized by cooperation thereof is shown. Therefore, it would be understood by those skilled in the art that these functional blocks may be implemented in a variety of forms by hardware only, software only, or a combination thereof.

There will now be described the overall operation of the vehicle system 1 having the configuration set forth above. First, the server device 40 allows multiple vehicles 10 to move such that the vehicles 10 constitute, for example, the arrangement pattern shown in FIG. 2. As described previously, each vehicle 10 may be driven by a driver. When visitors are fewer awhile after the opening of the event, it will be inconvenient if the arrangement pattern is too large, so that the first arrangement pattern is set relatively smaller with respect to the area of the venue. A space between vehicles 10 in the first arrangement pattern may be set as the minimum space. Also, the deriver 52 may be set not to derive the second move instruction for a predetermined period even when a congestion degree is the second threshold or less.

When the number of visitors increases and a congestion degree becomes the first threshold or greater, the server device 40 may transmit the second move instruction to all the vehicles 10, for example. It is considered that the multiple vehicles 10, which have received the second move instruction, are moved sequentially from the outermost vehicles 10, which can be moved, in the arrangement pattern. Since each vehicle 10 announces to the vicinity thereof the vehicle's moving by means of sound or light or both, the visitors around the vehicle 10 move away from the vehicle 10, so that the vehicle 10 can be moved.

Figure 8:
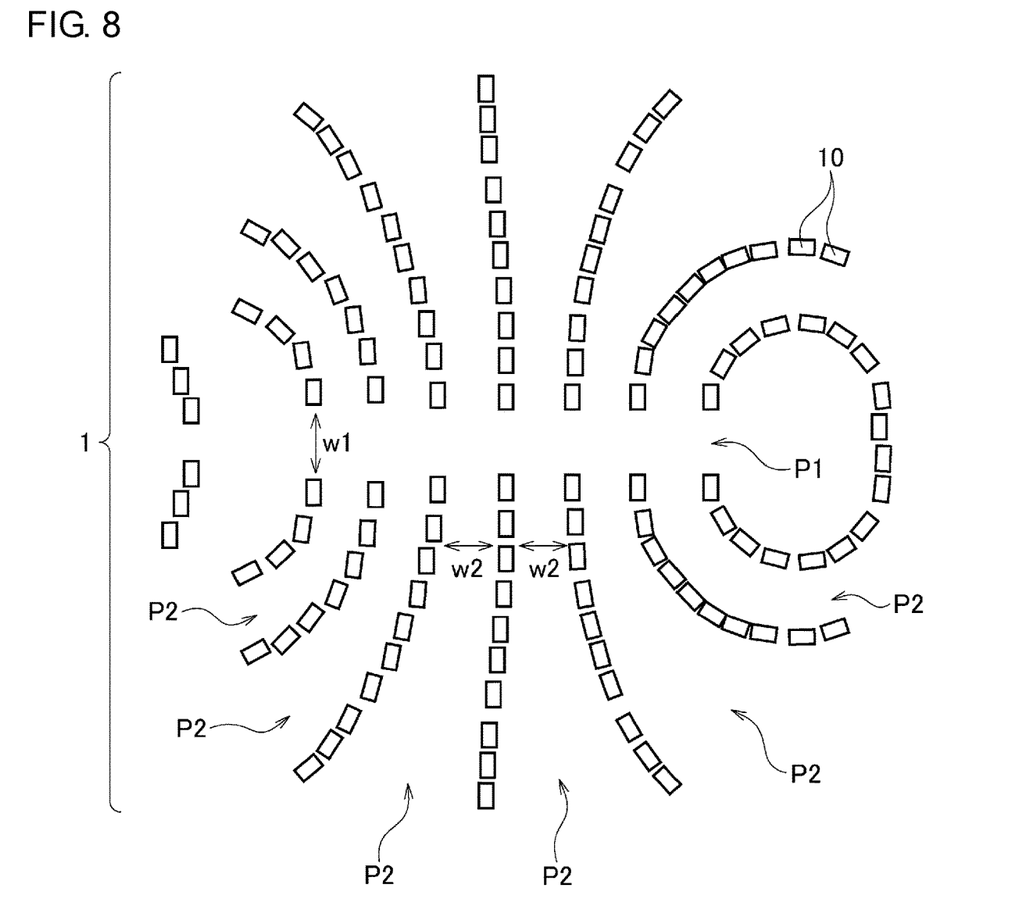
FIG. 8 is a bird's-eye view that shows an arrangement pattern after the plurality of vehicles in the arrangement pattern shown in FIG. 2 are moved in accordance with an instruction of the server device.

FIG. 8 is a bird's-eye view that shows an arrangement pattern after the multiple vehicles 10 in the arrangement pattern shown in FIG. 2 are moved in accordance with an instruction of the server device 40. The arrangement pattern becomes larger than that of FIG. 2, and the width w1 of the main passage P1 and the width w2 of the sub-passages P2 become wider than those shown in FIG. 2, so that more visitors can be accepted.

After the deriver 52 derives the second move instruction for broadening a space and the move of the multiple vehicles 10 is completed accordingly, when a congestion degree becomes the first threshold or greater again, the deriver 52 may derive the second move instruction for broadening a space again. After the deriver 52 derives the second move instruction for broadening a space and the move of the multiple vehicles 10 is completed accordingly, when a congestion degree becomes the second threshold or less, the deriver 52 derives the second move instruction for narrowing a space.

Figure 9:
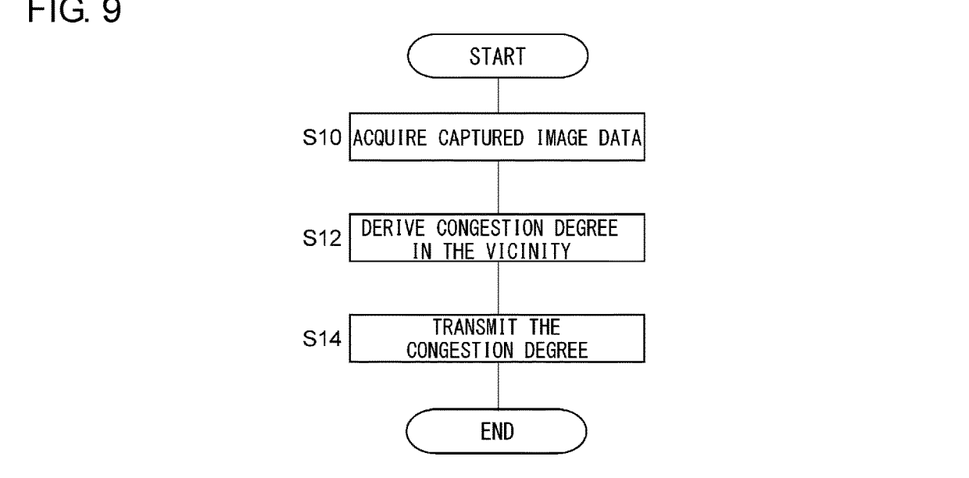
FIG. 9 is a flowchart that shows processing for deriving a congestion degree, performed in the vehicle-mounted device shown in FIG. 6.

FIG. 9 is a flowchart that shows processing for deriving a congestion degree, performed in the vehicle-mounted device 20 shown in FIG. 6. This processing is regularly repeated. The deriver 32 acquires captured image data (S10) and derives a congestion degree in the vicinity of the subject vehicle (S12), and the communication unit 22 transmits the congestion degree to the server device 40 (S14).

Figure 10:
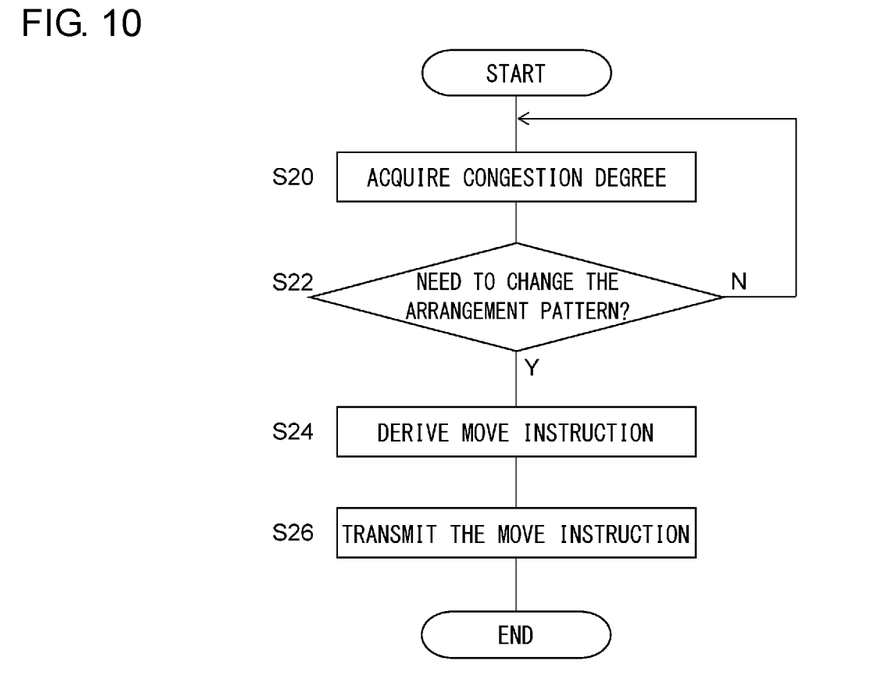
FIG. 10 is a flowchart that shows processing for changing the arrangement pattern, performed in the server device shown in FIG. 7.

FIG. 11 is a flowchart that shows processing for changing the arrangement pattern, performed in the server device 40 shown in FIG. 7. The acquirer 50 acquires a congestion degree in the vicinity of each vehicle 10 (S20) and, when the arrangement pattern need not be changed (N at S22), the process returns to the step S20. When the arrangement pattern needs to be changed (Y at S22), the deriver 52 derives a move instruction (S24), and the communication unit 42 transmits the move instruction to a target vehicle (S26).

Figure 11:
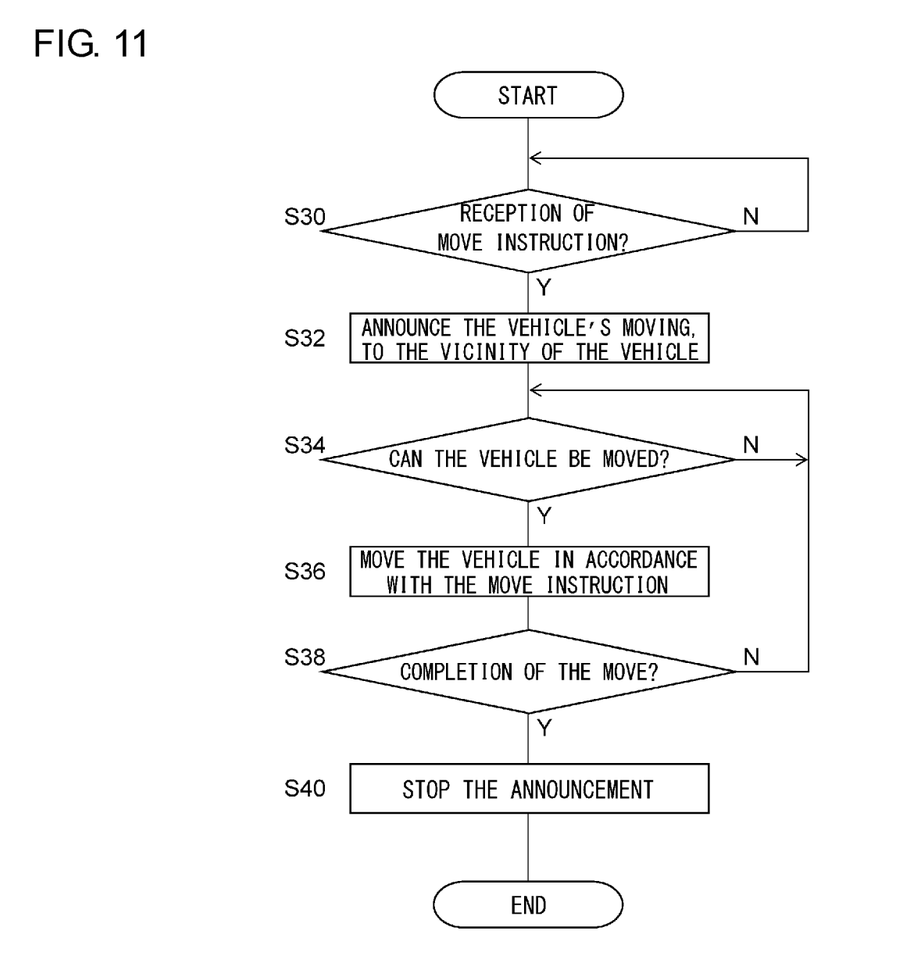
FIG. 11 is a flowchart that shows processing for moving a vehicle, performed in the vehicle-mounted device shown in FIG. 6.

FIG. 11 is a flowchart that shows processing for moving a vehicle 10, performed in the vehicle-mounted device 20 shown in FIG. 6. When the communication unit 22 receives no move instruction (N at S30), the vehicle-mounted device 20 waits. When the communication unit 22 receives a move instruction (Y at S30), the announcement unit 30 announces, to the vicinity of the subject vehicle, the subject vehicle's moving (S32), and, when the subject vehicle cannot be moved (N at S34), the vehicle-mounted device 20 waits. When the subject vehicle can be moved (Y at S34), the vehicle controller 34 allows the subject vehicle to automatically move in accordance with the move instruction (S36), and, when the move is not completed (N at S38), the process returns to the step S34. When the move is completed (Y at S38), the announcement unit 30 stops the announcement (S40), and the processing is terminated.

Thus, according to the present embodiment, based on a congestion degree in the vicinity of each vehicle 10, the second move instruction for moving at least one target vehicle among the multiple vehicles 10 is derived to change a space between vehicles 10, so that a space can be changed based on a congestion degree. Therefore, congestion can be appropriately handled in a state where multiple vehicles 10 are arranged.

Also, when a congestion degree is the first threshold or greater, the second move instruction for broadening a space is derived, so that occurrence of congestion can be restrained, and the discomfort of the visitors can be reduced. Further, more visitors can be accepted.

When a congestion degree is the second threshold or less, the second move instruction for narrowing a space is derived, so that occurrence of a situation in which the space is too broad for the number of visitors can be restrained.

Also, upon reception of a move instruction, the vehicle-mounted device 20 announces to the vicinity of the vehicle 10 the vehicle's moving, so that the visitors around the vehicle 10 can be notified of the vehicle's moving, and the vehicle 10 can be safely moved.

Described above is an explanation based on an exemplary embodiment. The embodiment is intended to be illustrative only, and it will be obvious to those skilled in the art that various modifications to a combination of constituting elements or processes could be developed and that such modifications also fall within the scope of the present disclosure.

For example, although there has been described an example in which the vehicle system 1 comprises the server device 40 separate from the multiple vehicle-mounted devices 20, one of the multiple vehicle-mounted devices 20 may have the functions of the server device 40. Also, the server device 40 may be installed in a data center, for example, and may accept an arrangement instruction or the like via wireless communication from a terminal device carried by a manager. This modification allows greater flexibility in the configuration of the vehicle system 1.

Also, at the entrance of the venue where the vehicle system 1 is provided, a sensor for counting the numbers of people entering and exiting from the venue may be provided, and the numbers of people may be transmitted from the sensor to the server device 40. In this case, the acquirer 50 in the server device 40 may acquire the congestion degrees in the vicinity of multiple vehicles 10 arranged in an arrangement pattern, based on the numbers of people entering end exiting from the venue transmitted from the sensor. This modification also allows greater flexibility in the configuration of the vehicle system 1.

What is claimed is:

1. An information processing device, comprising: a processing unit configured to: acquire a congestion degree in a vicinity of a plurality of vehicles arranged in a predetermined arrangement pattern; derive a move instruction for moving a target vehicle among the plurality of vehicles such as to change a space between vehicles, on the basis of the acquired congestion degree, wherein: when the congestion degree is a first threshold or greater, a move instruction for moving the target vehicle such as to broaden the space between vehicles is derived; and when the congestion degree is a second threshold or less, a move instruction for moving the target vehicle such as to narrow the space between vehicles is derived, wherein the second threshold is smaller than the first threshold; transmit the move instruction to the target vehicle; and cause the target vehicle to move in accordance with the move instruction.

2. A vehicle-mounted device configured to be mounted on a vehicle, the vehicle-mounted device comprising a processing unit configured to: capture an image of a vicinity of the vehicle; derive a congestion degree in the vicinity of the vehicle, on the basis of the captured image; transmit the congestion degree to an information processing device and to receive, from the information processing device, a move instruction derived to change a space between vehicles on the basis of the congestion degree wherein: when the congestion degree is a first threshold or greater, a move instruction for moving the target vehicle such as to broaden the space between vehicles is derived, and when the congestion degree is a second threshold or less, a move instruction for moving the target vehicle such as to narrow the space between vehicles is derived, wherein the second threshold is smaller than the first threshold; and move the vehicle in accordance with the move instruction.

3. The vehicle-mounted device of claim 2, further comprising an announcement unit configured to announce, to the vicinity of the vehicle, the vehicle's moving when the move instruction is received.

4. An information processing method, comprising: acquiring a congestion degree in a vicinity of a plurality of vehicles arranged in a predetermined arrangement pattern; deriving a move instruction for moving a target vehicle among the plurality of vehicles such as to change a space between vehicles, on the basis of an acquired congestion degree, wherein: when the congestion degree is a first threshold or greater, a move instruction for moving the target vehicle such as to broaden the space between vehicles is derived, and when the congestion degree is a second threshold or less, a move instruction for moving the target vehicle such as to narrow the space between vehicles is derived, wherein the second threshold is smaller than the first threshold; and transmitting the move instruction to the target vehicle and causing the target vehicle to move in accordance with the move instruction.

* * * * *

UNITED STATES PATENT AND TRADEMARK OFFICE
CERTIFICATE OF CORRECTION

PATENT NO. : 10,977,935 B2  
APPLICATION NO. : 16/224002  
DATED : April 13, 2021  
INVENTOR(S) : Tomohito Matsuoka et al.

It is certified that error appears in the above-identified patent and that said Letters Patent is hereby corrected as shown below:

In the Specification

In Column 1, Line(s) 32, delete "issuer" and insert --issue,--, therefor.

In Column 1, Line(s) 34, delete "in formation" and insert --information--, therefor.

In Column 3, Line(s) 13, after "vehicle", delete "18" and insert --10--, therefor.

In Column 4, Line(s) 29, delete "derive" and insert --deriver--, therefor.

In Column 6, Line(s) 29, delete "positron" and insert --position--, therefor.

In Column 8, Line(s) 3, delete "FIG. 11" and insert --FIG. 10--, therefor.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*